United States Patent Office 3,495,522
Patented Feb. 17, 1970

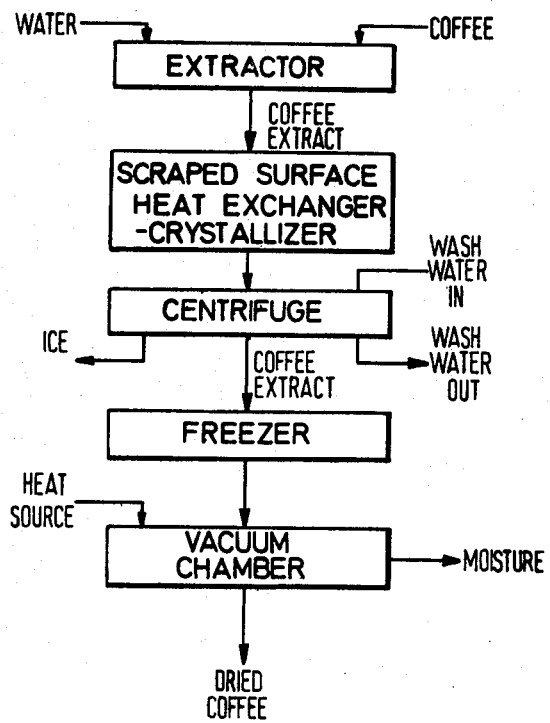

3,495,522
BEVERAGE APPARATUS
John George Muller, McLean, Va., assignor to Struthers Scientific and International Corporation, a corporation of Delaware
Application June 21, 1968, Ser. No. 738,776, which is a division of application Ser. No. 523,574, Jan. 28, 1966. Divided and this application June 2, 1969, Ser. No. 829,613
Int. Cl. A23f 1/08
U.S. Cl. 99—236  3 Claims

ABSTRACT OF THE DISCLOSURE

A system of apparatus for dehydrating coffee and tea is disclosed in which a freeze concentration device includes an integral agitator device and an ice separating centrifuge which is connected to a freeze drying device which removes moisture from the freeze concentrated product under vacuum by sublimation and heat.

---

The present application is a division of my copending application Ser. No. 738,776, filed June 21, 1968, which in turn is a division of Ser. No. 523,574, filed January 28, 1966, now U.S. Patent No. 3,404,007.

The drawing shows schematically the preferred connecting and arrangement of the system of apparatus according to the invention.

This invention relates to an improved process for the preparation of powdered soluble food products and is particularly applicable to the preparation of powdered or soluble coffee and tea.

Soluble or "powdered" coffee has been prepared by first extracting coffee beans with hot water and subsequently dehydrating the extract by spray drying under either vacuum or slightly elevated pressure conditions. This process has met with vast commercial success, but the flavor of the soluble coffee leaves much to be desired. Volatile taste and flavor elements of the coffee are lost through evaporation, and more oxidation takes place also because of the elevated temperatures and pressure of air. The resulting soluble product is, therefore, never as good as the extract from which it is prepared.

To improve the flavor of the soluble coffee, it has been often proposed to remove substantial amounts of the water in the extract by partially freezing the extract and separating the resulting pure ice crystals from the concentrated extract. This process of partial freezing is then followed by a complete dehydration under vacuum conditions. In this way the coffee loses less of the volatile components by virtue of the fact that the extract is subject to vacuum conditions for shorter periods of time.

The conventional method for complete dehydration of the coffee product is by means of spraying the concentrated extract at high temperature into a tower to flash off all remaining water so that the final product is a soluble powder. Unfortunately, during this flash evaporation process which is known as spray drying, much of the flavor components of the coffee which are volatile flash off along with the water and must somehow be replaced in the coffee powder. Even this replacement of the coffee aroma elements into the coffee powder produces a product which is not truly comparable to freshly brewed coffee.

Similarly, soluble powdered tea has been prepared by first brewing tea extract and then completely dehydrating the extract. As with powdered coffee, the soluble tea product leaves much to be desired in terms of its flavor.

It is therefore an object of this invention to provide an improved process for the preparation of soluble coffee and tea products. Another object of this invention is the preparation of powdered comestible materials which may be reconstituted in water.

The objects of this invention are accomplished by a process for the preparation of a dehydrated beverage product, including soluble coffee and soluble tea, the process comprising preparing an extract of the beverage from a vegetable product containing extractable flavor, subjecting the extract to concentration by partial freezing to form ice crystals and a more concentrated extract, separating the more concentrated extract from the ice crystals and subjecting the more concentrated extract to relatively complete dehydration by freeze drying.

When applied to the preparation of soluble coffee, the process comprises preparing a coffee extract by extracting coffee grounds with water, subjecting the extract to concentration by partial freezing to form ice crystals and a concentrated coffee extract, separating the concentrated extract from the ice crystals and subjecting the concentrated extract to complete dehydration by freezing the concentrated extract to a solid mass and subjecting the thus frozen extract to dehydration under low temperatures and reduced pressure.

The initial steps in the process of preparing instant coffee are the same as preparing regular coffee. Following roasting, the coffee is ground, but the granulation may be extremely coarse, and, in some cases, fine particles that may result from grinding are sieved out and used elsewhere.

The grounds are placed in closed containers known as extractors. These extractors are set up in batteries with several extractors to a battery.

Ground coffee and hot water are charged into the first extractor. The coffee is then extacted until the necessary materials have been removed from the grounds. The resulting extract is then charged into the second extractor containing fresh coffee. The second extractor is run until extraction is completed. The resulting coffee extract (which is now stronger than ordinary coffee beverage) is placed in the third extractor containing fresh grounds and the brewing process is again repeated.

In commercial plant operation, the process is conducted in a semi-continuous manner, the fresh water coming into an extraction battery first reaches the extractor having the most spent, exhausted grounds and proceeds from there to the next most spent grounds and so on until, finally, in the last extractor it reaches the fresh, most recently added grounds. This is known as a countercurrent extraction system.

Temperature and pressure in the extractor system will vary greatly. Coffee being produced from fresh grounds is usually processed at low temperature with low pressure. Coffee being produced from spent, exhausted grounds is extracted at high temperature and under high pressure.

The coffee extract to be concentrated by freeze concentration can have any coffee solids content from a few percent (such as from about 3 to 10 percent) to as high as 40 to 50 percent. That is, there may be as much as 40 to 50 lbs. of coffee solids in the extract for each 100 lbs. of extract. However, the lower the solids content of the extract, the more the water which must be removed during the freeze concentration and drying steps. On the other hand, it has been found that carrying the extraction process to the point where high coffee solids content can be achieved often lowers the flavor quality of the extract. Thus, a preferred range of coffee solids content of the extract before freeze concentration for the practice of this invention is from about 10 to 30 percent coffee solids.

In prior art processes, after leaving the extractor system the coffee extract is clarified of sediment while still at an elevated temperature. One of the most common methods of clarification is by means of a centrifuge in which the coffee liquid is passed through a rapidly rotating cylinder and discharges the clear liquid. Another method is by means of a pressure pump forcing the concentrate through porous paper or cloth.

Various methods of preparing coffee extracts which may be employed in the process of this invention are described in Sivetz and Foote, "Coffee Processing Technology," vol. 1, pages 261 through 319 and vol. 2, pages 215 through 246, published by the AVI Publishing Company, Inc., Westport, Conn. in 1963. In addition, process and equipment described in the following U.S. patents can be employed in preparing coffee extracts useful in the process of this invention: 2,340,758; 2,410,157; 2,515,730; 2,915,399; 2,915,403; 2,629,663; 2,783,149; 2,437,768

After being freed from the sediment, the resulting coffee extract is then subjected to concentration by partial freezing of the water therefrom. This freeze concentration process can be conducted in batch, semicontinuous or continuous apparatus according to methods known to the art and improvements of the methods. However, any method of removing the water from the coffee extract by crystallization as ice is applicable to the process of this invention. The resulting slurry of ice and concentrated coffee extract is then subjected to centrifugation to free the concentrated solution of the ice crystals. The resulting ice crystals are ordinarily washed with water or dilute coffee extract to free the ice crystals completely of residual mother liquor and the washings may be returned to the freeze concentration process or to the extractors or to existing spray dryers.

The freeze concentration of the extract can be accomplished in either a single stage or in a plurality of stages each of which comprises a crystallizer in which heat is removed from the coffee extract to form a slurry of ice crystals and concentrated mother liquor. After each crystallization stage, ice is removed from the slurry and the concentrated extract either goes to further processing in the preparation of soluble or powdered coffee or is further concentrated in a subsequent stage of the freeze concentration process. The crystallization of ice from the extract is preferably carried out in a tubular heat exchanger, the outside surfaces of which are cooled by a circulating refrigerant. The internal section of the tube is ordinarily fitted with a shaft on which is located agitator paddles. Alternatively, a conventional scraped surface tubular heat exchanger may be employed. Any acceptable separating device or centrifuge may be employed for separating the concentrated coffee extract from the resulting ice crystals. This centrifuge is the preferred method for separating ice from the mother liquor and ordinarily consists of a rotating basket which contains perforations for allowing passage of the mother liquor. The centrifuge may also be equipped with some means for washing residual mother liquor from the ice crystals.

After concentration by partial freezing and separation of the resulting ice crystals, and prior to relatively complete dehydration by freeze drying, the concentrated coffee extract may contain from less than 30 to about 50 percent or more by weight of coffee solids. To reduce the water removal requirements of the freeze drying step, it is preferred that the effluent from the concentration by partial freezing contain as high as possible a percentage of coffee solids. However, the higher the percentage of coffee solids, the more viscous is the coffee liquor and the more difficult it is to separate efficiently from the ice crystals. Thus, a preferred embodiment of this invention comprises partially concentrated coffee extract having up to about 50 percent coffee solids prior to relatively complete dehydration by freeze drying.

Processes for concentration of the extract by a freezing process are described in vol. 2, pages 14 through 21 of Sivetz, Coffee Processing Technology (The AVI Publishing Co., 1965). In addition, various processes for freeze concentration are described in the following U.S. patents: 2,977,234; 2,967,778; 2,888,353; 2,887,851; 2,862,824; 2,854,494; 2,851,368; 2,815,288; 2,800,001; 2,764,880; 2,764,488; 2,735,779; 2,734,355; 2,676,469; 2,657,551; 2,657,549; 2,559,204; 2,552,525; 2,552,523; 2,503,695.

After the coffee extract has been concentrated by partial freezing and separation of the resulting ice crystals, it is dehydrated to powder form by a method known in the art as freeze drying. According to this method, the coffee extract is frozen to a low temperature and subjected to vacuum conditions so that the ice sublimes away from the mass, leaving only the coffee solids containing but a small amount of water. During the vacuum sublimation of the ice, heat must be supplied to maintain the temperature at the particular level required to maintain the process at the vacuum conditions selected. Processes for freeze drying coffee extract are described in Van Arsdel, Food Dehydration, I, Principles, and Copely and Van Arsdel, Food Dehydration II, Products and Technology, both published by the AVI Publishing Company, Inc., Westport, Conn., 1963 and 1964 respectively. In addition, freeze drying processes and equipment are described in U.S. patents: 2,620,573; 2,292,447; 3,132,929; 2,445,120; 1,979,124; 2,414,940; 2,302,253; 2,731,734; 2,994,132; 3,078,586; 3,132,930; 3,146,077; 3,178,829; 3,192,643; 3,199,217; 3,174,229; 2,353,986; 2,751,687; 2,411,152; 2,225,627; 2,374,232; 2,616,604; 2,903,139; 3,013,341; 3,088,222; 3,135,589; 3,176,408; 3,184,862; 3,192,645. To accomplish this freeze drying, the coffee solids are generally frozen to a temperature between −40° F. and −50° F., and subjected to pressures ranging from .250 mm. of Hg to .200 mm. of Hg. Depending upon the condition employed, residence times in the batch freeze drying apparatus vary from less than 4 to 10 hours, or longer. Where continuous freeze drying is employed, then residence time will be as long as 20 hours, or longer.

Coffee solids are generally dehydrated in this process to have between about 1 and 5 percent residual water. Therefore, as used throughout this specification, the term completely dehydrated coffee solids refers to the dehydrated coffee product prepared by freeze drying which contains from 1 to 5 percent moisture.

The soluble powdered coffee product prepared by the process of this invention has many advantages over the powdered material prepared by prior art processes. By following the process of this invention, the powdered coffee product has a flavor and aroma much more closely resembling that of freshly brewed coffee. This is because freeze concentration, combined with freeze drying, operates under such conditions whereby a minimum of the volatile coffee flavor and aroma elements are removed during processing. Furthermore, the soluble coffee product produced by the process of this invention may have a higher bulk density than soluble coffee products produced by prior art processes and, in addition, is more readily soluble in cold water than are prior art products and is darker in color.

EXAMPLE 1

Ground coffee and water are charged to a countercurrent extractor and extracted to result in an extract containing 24 percent soluble coffee solids. This extract was continuously metered into a crystallizer wherein 10 pounds per minute of water formed individual ice crystals to result in a slurry of concentrated coffee, having 32 percent soluble coffee solids and ice. This slurry was conveyed to a centrifuge having a basket rotating at 2200 revolutions per minute and a wash water rate of 4 pounds of fresh water per minute. The concentrated solution of coffee was discharged through the perforated rotating basket as product at the rate of 30 pounds per minute and contained 32 percent soluble coffee solids.

This solution is then poured onto trays and frozen at a temperature of −40° F. Then the trays are inserted into a freeze-drying apparatus. There, the ice in the frozen mass is sublimed as the pressure is reduced. The final pressure vacuum is .250 mm. Heating is applied to the shelves on a programmed basis, with temperature ranging from 250° F. at the beginning of the cycle to 90° F. at its conclusion. Duration of the cycle is approximately 8 hours. The resulting dry coffee product has about three percent moisture and is readily soluble in water. It has a flavor preferably to soluble coffee prepared by other methods.

EXAMPLE 2

A tea extract containing 6.8 percent tea solids, at above 80° F. after extraction, is cooled in a heat exchanger to 36° F. The cooled material is then freeze concentrated in a tubular crystallizer. The resulting ice-concentrated tea slurry is then separated on a rotating basket screen-type centrifuge and frozen solid, then freeze dried to 3 percent moisture to give a superior soluble tea product.

Although the invention has been described with reference to particular embodiments thereof, it is to be understood that various changes may be made without departing from the spirit of the invention as defined by the scope of the appended claims.

What is claimed is:

1. A system of apparatus for preparing a dehydrated coffee or tea beverage product from an aqueous liquid, the extract, comprising:
    (a) concentrating means for partially freezing the liquid extract to form ice therein by indirect exchange of heat across a tubular heat exchange surface between the extract and a circulating refrigerant;
    (b) means coacting with concentrating means (a) for agitating extract and removing ice from said tubular heat exchange surface;
    (c) centrifuge means for separating ice formed in the extract from said liquid extract;
    (d) freezing means for freezing the extract;
    (e) means for removing moisture under vacuum from frozen extract by sublimation; and
    (f) heat source means coacting with vacuum means for heating and drying the frozen extract.

2. The apparatus of claim 1 including means coacting with the centrifuge means (c) for washing ice separated from the extract.

3. The apparatus of claim 2 including means coacting with the centrifuge means (c) for recovering solids from washings.

References Cited

UNITED STATES PATENTS

| | | |
|---|---|---|
| 1,507,410 | 9/1924 | Zorn. |
| 1,636,890 | 7/1927 | Zorn. |
| 2,292,447 | 8/1942 | Irwin. |
| 2,416,945 | 3/1947 | Noyes. |
| 2,509,681 | 5/1950 | Flosdorf. |
| 2,751,687 | 6/1956 | Colton. |
| 2,852,388 | 9/1958 | Cortez. |
| 2,967,778 | 1/1961 | Cole. |
| 2,345,548 | 3/1944 | Flosdorf. |
| 2,471,677 | 5/1949 | Flosdorf. |
| 3,373,042 | 3/1968 | Elerath. |

FOREIGN PATENTS 529,202  11/1940  Great Britain.

ROBERT W. JENKINS, Primary Examiner

U.S. Cl. X.R.

34—92; 99—71